United States Patent
Inoko et al.

(10) Patent No.: US 10,965,915 B2
(45) Date of Patent: Mar. 30, 2021

(54) COLLECTION SYSTEM, PROGRAM FOR TERMINAL, AND COLLECTION METHOD

(71) Applicant: TEAMLAB INC., Kanda-Ogawa-machi (JP)

(72) Inventors: Toshiyuki Inoko, Kanda-Ogawa-machi (JP); Wataru Sakashita, Kanda-Ogawa-machi (JP); Hiroki Takizawa, Kanda-Ogawa-machi (JP)

(73) Assignee: TEAMLAB INC., Tokyo (JP)

( * ) Notice: Subject to any disclaimer, the term of this patent is extended or adjusted under 35 U.S.C. 154(b) by 3 days.

(21) Appl. No.: 16/467,497

(22) PCT Filed: Dec. 4, 2017

(86) PCT No.: PCT/JP2017/043422
§ 371 (c)(1),
(2) Date: Aug. 22, 2019

(87) PCT Pub. No.: WO2018/105544
PCT Pub. Date: Jun. 14, 2018

(65) Prior Publication Data
US 2019/0373224 A1    Dec. 5, 2019

(30) Foreign Application Priority Data
Dec. 8, 2016  (JP) .............................. JP2016-238833

(51) Int. Cl.
*H04N 7/18* (2006.01)
*A63F 13/213* (2014.01)
(Continued)

(52) U.S. Cl.
CPC .......... *H04N 7/185* (2013.01); *A63F 13/213* (2014.09); *A63F 13/216* (2014.09); *A63F 13/65* (2014.09); *H04W 4/021* (2013.01); *H04W 4/80* (2018.02)

(58) Field of Classification Search
None
See application file for complete search history.

(56) References Cited

U.S. PATENT DOCUMENTS

2003/0063575 A1* 4/2003 Kinjo .................... G06Q 30/06
                                                          370/265

FOREIGN PATENT DOCUMENTS

JP    2002-073689 A    3/2002
JP    2003-178221 A    6/2003
(Continued)

OTHER PUBLICATIONS

International Search Report of International Patent Application No. PCT/JP2017/043422 completed Feb. 9, 2018 and dated Feb. 20, 2018 (2 pages).

(Continued)

*Primary Examiner* — Christopher Braniff
(74) *Attorney, Agent, or Firm* — Pyprus Pte Ltd

(57) ABSTRACT

Without carrying out an analysis process of a photographic image, to identify a type of a subject which a terminal device has photographed. Based on data of a timetable format, a specified display device 40 displays the video of the subject of a specified type for a specified display time. A terminal device 10 specifies a photography location and a photography time by a camera 14. Based on the data of a timetable format, an assessment is made as to whether the photography location belongs to the same area as the display device 40 and whether the photography time matches the display time of the video of the specified type subject upon the display device. If it is assessed that said match is true, it is determined that the video of the specified type subject has been photographed by the terminal device.

4 Claims, 5 Drawing Sheets

(51) Int. Cl.
*A63F 13/216* (2014.01)
*A63F 13/65* (2014.01)
*H04W 4/80* (2018.01)
*H04W 4/021* (2018.01)

(56) References Cited

FOREIGN PATENT DOCUMENTS

| | | | |
|---|---|---|---|
| JP | 2016-062273 A | | 4/2016 |
| JP | 2016062273 | * | 4/2016 |

OTHER PUBLICATIONS

Written Opinion of International Patent Application No. PCT/JP2017/043422 completed Feb. 9, 2018 and dated Feb. 20, 2018 (3 pages).

* cited by examiner

COLLECTION SYSTEM, PROGRAM FOR TERMINAL, AND COLLECTION METHOD

TECHNICAL FIELD

The present invention relates to a system, a program and a method which can collect images of characters in a digital picture book. More specifically, the present invention relates to a system which provides a recreation that a target video image displayed by, for example, a projector is captured by a camera of a mobile terminal to collect information related to this target together with a captured image in a digital picture book.

BACKGROUND ART

In recent years, as a diffusion rate of highly functional and multifunctional mobile terminals (so-called smartphones) becomes high, there are many attempts to enhance the ability to attract customers to exhibitions and stores by providing attractive content to mobile terminals owned by users.

For example, Patent Literature 1 discloses a store customer attraction assist system which uses a so-called Augmented Reality (AR) technique. The system according to Patent Literature 1 projects a video image of a predetermined character on a screen provided in an area in which a product in a store is arranged, causes a user to capture this video image by a mobile terminal, specifies a character included in this captured image, and registers the specified character as a captured character in a picture book. This system transmits an image captured by the mobile terminal of the user to a management server via the Internet, causes the management server to analyze the captured image, and specifies the character included in this image. In the video image of the character projected on the screen, marking information (example: the shape of a hat of the character) is embedded. Therefore, by extracting this marking information from the captured image, the management server can specify which type of the character the user has captured.

CITATION LIST

Patent Literature

Patent Literature 1: JP 2016-62273 A

SUMMARY OF INVENTION

Technical Problem

By the way, the system according to Patent Literature 1 causes the management server to analyze an image captured by the mobile terminal, extracts the marking information from this image, and specifies the character included in the image. In this system, image analysis processing is centralized in and performed by the management server. However, it is assumed that, when this system is introduced in exhibition halls or stores, multiple mobile terminals simultaneously access the management server. In this case, when the management server single-handedly undertakes relatively heavy processing which is image analysis, and multiple captured images are simultaneously transmitted to the management server, processing capability of the management server does not catch up, and therefore a system error is caused, a bottleneck occurs, and an image analysis result cannot be quickly provided to a mobile terminal of a user.

Furthermore, the system according to Patent Literature 1 assumes a state (online state) where the mobile terminal of the user can connect with the Internet, and does not function in a state (offline state) where the mobile terminal cannot connect with the Internet. That is, in the system according to Patent Literature 1, the mobile terminal transmits a captured image to the management server, this management server analyzes the captured image and specifies a character included in this image, and therefore the mobile terminal cannot analyze the image in the offline state. However, there is a case where there are scattered places at which radio waves do not reach mobile terminals in the exhibition halls or stores. Therefore, there is a problem that, when a system is constructed assuming that mobile terminals are in the online state, the system does not function well, and users may feel stressful instead.

It is therefore a main object of the present invention to enable a collection system which causes a terminal device of a user to capture a target (character) video image displayed by a display device to specify a type of the target captured by the terminal device without performing analysis processing on the captured image.

Solution to Problem

As a result of the earnest study on means for solving the problem of the above conventional invention, the inventors of the invention have obtained knowledge that, by controlling a display device based on target appearance information for specifying a place (display device) for displaying a target video image, a target type and a display time, a terminal device can specify the type of the target captured by the terminal device without analyzing a captured image of the terminal device when a capturing place and a capturing time of the terminal device match with target appearance information. Furthermore, by providing the above target appearance information to the terminal device and causing the terminal device to judge whether or not the capturing place and the capturing time match with the target appearance information, it is possible to quickly specify the type of the target captured by the terminal device. Furthermore, the inventors have conceived that it is possible to solve the problem of the conventional technique based on the above knowledge, and finished the present invention. More specifically, the present invention includes the following configuration and processes.

A first aspect of the present invention relates to a collection system. The system according to the present invention includes at least: a terminal device which includes a capturing unit; a plurality of display devices which displays a target video image; and a management device which controls the display devices.

The management device includes a display device control unit. The display device control unit performs control for causing a specific display device to display a video image of a target of a specific type during a specific display time based on "target appearance information". The "target appearance information" described herein is information for specifying at least a display device (place) which displays a target video image, a type of the target which is displayed by the display device and a display time of the target video image of the type. In addition, the target appearance information may be, for example, information which defines to cause a specific display device to display the target video image of the specific type in a "specific time zone", or information which defines to cause the specific display device to display the target video image of the specific type "now".

The terminal device includes a position information specifying unit and a clocking unit. The position information specifying unit specifies a capturing place at which the capturing unit has performed capturing. In addition, the position information obtaining unit is, for example, a GPS reception unit or an ultrasonic sensor described below. The clocking unit specifies a capturing time at which the capturing unit has performed the capturing.

In addition, the system according to the present invention judges whether or not; a capturing place of a certain terminal device belongs to a same area as that of a certain display device; and a capturing time of the terminal device matches with a display time of the target video image of the specific type of the display device, based on the target appearance information. Furthermore, the system according to the present invention decides that the terminal device has captured the target video image of the specific type if judging that aforementioned is matched.

As in the above configuration, according to the system of the present invention, the target appearance information (timetable) defines information indicating which display device (Where) displays what type of a target (What) in which time zone (When). Consequently, by cross-checking the capturing place (Where) and the capturing time (When) of the terminal device with this target appearance information (timetable), it is possible to estimate which type (What) of the target the terminal device has captured. That is, even when the terminal device does not decide whether or not a target video image is actually captured in a captured image of the terminal device, if the terminal device has performed capturing within a display time at a display place of the target of the certain specific type, this captured image is highly likely to have the target video image of the specific type. Hence, the system according to the present invention assumes that, when the capturing place and the capturing time match with the target appearance information (timetable), this captured image has the target video image of the specific type. Consequently, it is possible to specify the type of the target captured by the user without analyzing the captured image.

In the system according to the present invention, a broadcast device which broadcasts position information of an area to the terminal device is preferably installed in the area in which the display devices are installed. The broadcast device is, for example, an ultrasonic wave generating device which generates an ultrasonic wave of a predetermined frequency and transmits position information of the area, a light emitting device which puts information on visible light or invisible light and transmits the position information of the area, and a wireless base station which transmits the position information of the area by near field wireless communication (so-called BLE) using a beacon. In this case, the position information specifying unit of the terminal device specifies the capturing place by obtaining the position information from the broadcast device. The position information obtaining unit of the terminal device may employ the ultrasonic sensor, an optical sensor or a beam reception device according to a mode of the broadcast device.

As described above, by installing the broadcast device associated with each display device in the area in which the display device is installed, it is possible to quickly transmit the position information to the terminal device. Furthermore, the terminal device easily judges whether or not the terminal device belongs to the same area as that of the display device.

In the system according to the present invention, the terminal device preferably further includes a storage unit and a target capturing success/failure deciding unit. The storage unit stores the target appearance information (timetable). Furthermore, the target capturing success/failure deciding unit judges whether or not: a capturing place of the terminal device belongs to a same area as that of the display device; and a capturing time of the terminal device matches with a display time of the target video image of the specific type of the display device, based on the target appearance information, and decides that the terminal device has captured the target video image of the specific type on it's own if judging that aforementioned is matched.

As in the above configuration, by causing the terminal device to store the target appearance information and causing the terminal device to judge whether or not the capturing place and the capturing time match with this target appearance information, it is possible to specify the type of the target included in the captured image even if the terminal device is in an offline state. That is, when specifying the target type, the terminal device does not need to be connected to the management device via the Internet.

According to the present invention, the management device may include a target appearance information generating unit which generates the target appearance information, and a communication unit which transmits the target appearance information to the terminal device.

As in the above configuration, by providing to the management device a function of generating the target appearance information, a place or a time zone at which the target appears can be changed or added at a site in an exhibition hall or a store in real time. Consequently, it is possible to take a measure of making a rare target appear at a place with a small number of customers, and decreasing a frequency at which the target appears at a place with a large number of customers.

The system according to the present invention may further include a server device which is connected to the terminal device and the management device via an Internet. In this case, the server device preferably includes a communication unit which receives the target appearance information generated by the management device, and transmits the target appearance information to the terminal device.

As in the above configuration, the target appearance information generated by the management device may be transmitted to the terminal device via the server device. In this case, by providing the target appearance information to the terminal device before the terminal device is brought in the exhibition hall or the store, it is possible to prevent an occurrence of any problem in particular even if the terminal device is in the offline state.

The system according to the present invention may further include a server device which is connected to the terminal device and the management device via an Internet. In this case, the server device can include a target appearance information generating unit (a component which generates the target appearance information), and a target capturing success/failure deciding unit (which judges whether or not: a capturing place of a certain terminal device belongs to a same area as that of a certain display device; and a capturing time of the terminal device matches with a display time of the target video image of the specific type of the display device, based on the target appearance information, and decides that the terminal device has captured the target video image of the specific type if judging that aforementioned is matched). In this case, although the terminal device cannot specify the type of the target included in the captured image when the terminal device is not in the online state during capturing, the system according to the present invention can include this aspect, too. Even this aspect can achieve at least the above-described first object.

A second aspect of the present invention relates to a program for a terminal device. The program according to the present invention causes a mobile information communication terminal (e.g., a general-purpose smartphone) to function as the terminal device in the system according to the above-described first aspect. The program according to the present invention may be downloaded to the mobile information communication terminal via the Internet or may be installed in advance in the mobile information communication terminal.

A third aspect of the present invention relates to a collection method executed by a computer system. The collection method according to the present invention includes a first process and a second process. The first process includes causing a specific display device to display a target video image of a specific type during a specific display time based on a display device which displays a target video image, a type of a target displayed by the display device, and target appearance information for specifying a display time of the target video image of the type. The second process includes judging whether or not: a capturing place of a certain terminal device belongs to a same area as that of a certain display device; and a capturing time of the terminal device matches with a display time of the target video image of the specific type of the display device, based on the target appearance information, and deciding that the terminal device has captured the target video image of the specific type if judging that aforementioned is matched. The method according to the third aspect of the present invention can be executed by the system according to the above-described first aspect.

Advantageous Effects of Invention

According to the present invention, it is possible to specify a type of a target captured by a terminal device without performing analysis processing on a captured image.

DESCRIPTION OF EMBODIMENTS

Hereinafter, a mode for carrying out the present invention will be described with reference to the drawings. The present invention is not limited to the embodiment described below, but includes changes appropriately made within the scope obvious to those skilled in the art.

Figure 1:
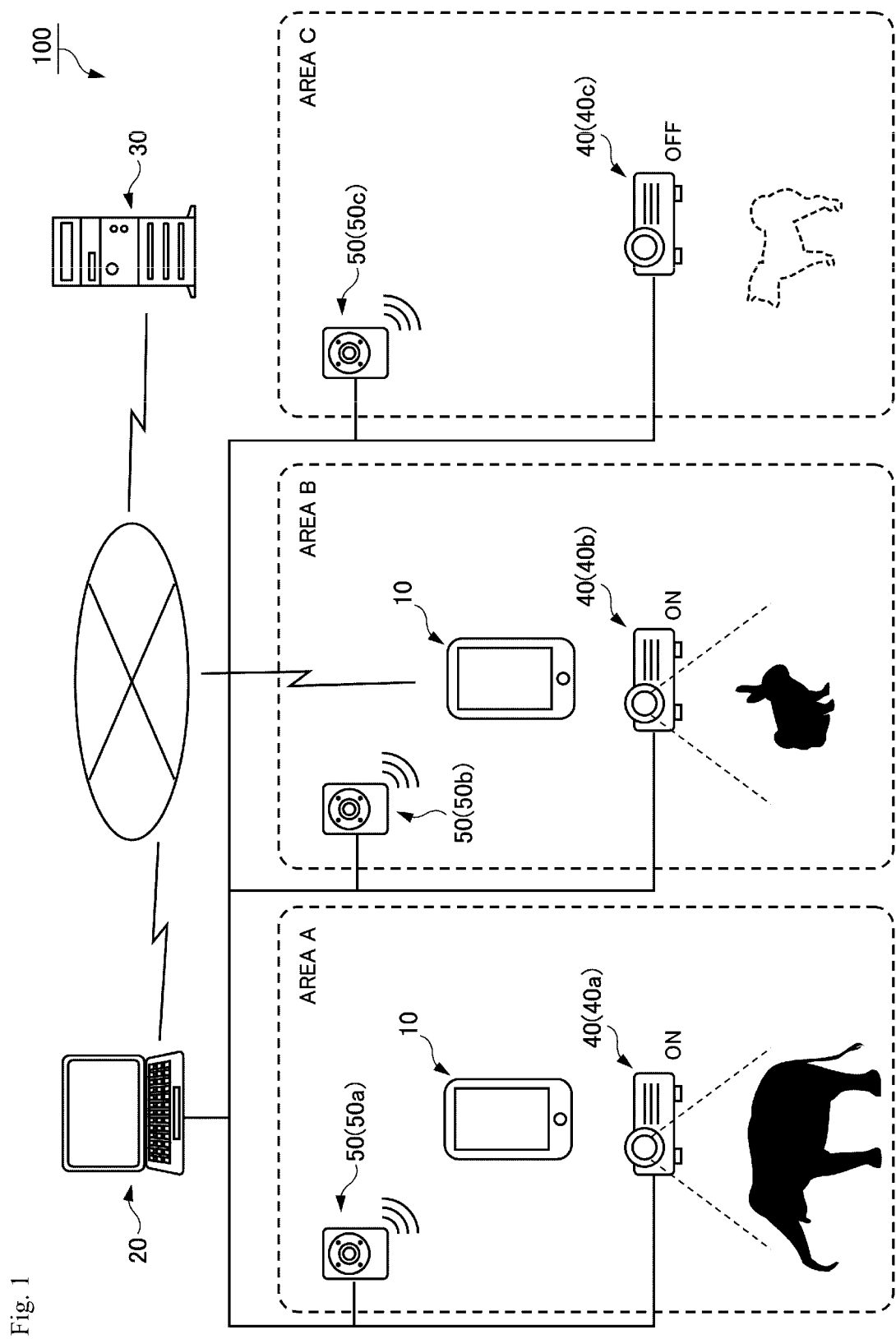
FIG. 1 is a conceptual diagram schematically illustrating an overall configuration of a collection system according to the present invention.

First, an outline of a collection system 100 according to the present invention will be described with reference to FIG. 1. FIG. 1 schematically illustrates an overall configuration of the collection system 100 according to one embodiment of the present invention. As illustrated in FIG. 1, the system 100 according to the present embodiment includes a terminal device 10, a management device 20, a server device 30, a plurality of display devices 40 and a plurality of broadcast devices 50. The terminal device 10 is owned by a user, and corresponds to a mobile information communication terminal such as a general smartphone. The management device 20 is installed at a site of an exhibition hall or a store and is operated by a system administrator, and corresponds to a general lap top personal computer. The server device 30 is a web server which is connected to the terminal device 10 and the management device 20 via the Internet, and is operated by the system administrator. Each display device 40 is connected to the management device 20 by way of wired or wireless connection, and displays video images under control of the management device 20. Each broadcast device 50 is a device which is disposed in the same area as that of each display device 40, and broadcasts position information for identifying each area to the terminal device 10.

As illustrated in FIG. 1, this system divides the exhibition hall or the store into a plurality of areas. Although there are three divided areas of an area A, an area B and an area C in an example illustrated in FIG. 1, more areas are actually provided. At least the display device 40 and the broadcast device 50 are installed one by one in each area. A broadcast device 50a in the area A transmits that the area in which the broadcast device 50a is installed is the "area A" to the terminal device 10. Similarly, a broadcast device 50b in the area B transmits that the area in which the broadcast device 50b is installed is the "area B" to the terminal device 10. Consequently, the terminal device 10 can receive information from each broadcast device 50, and decide which area a current position of the terminal device 10 belongs to. Furthermore, the display device 40 is installed in each area, and the display devices 40 belonging to different areas are separately controlled by the management device 20. For example, in the example illustrated in FIG. 1, a display device 40a belonging to the area A displays a video image of an elephant, a display device 40b belonging to the area B displays a video image of a rabbit, and a display device 40c belonging to the area B does not display a video image. Thus, a type of a video image to be displayed and a timing to display the video image of the display device 40 in each area are individually controlled by the management device 20.

The user brings the terminal device 10 owned by the user into each area, and captures a video image displayed by each display device 40 by using a capturing unit (camera) of the terminal device 10. When the terminal device 10 has performed capturing within a display time in which a target video image of a specific type is displayed in each area, the system decides that a captured image of this terminal device 10 has the target video image of the specific type. For example, the display device 40a displays the video image of the elephant in the area A. When the terminal device 10 has performed capturing in the area A within a display time of this video image of the elephant, it is decided that this captured image has the video image of the elephant. This system is used for a recreation which intends to capture a video image displayed by the display device by using the terminal device. Therefore, when within the display time in which the target video image of the specific type is displayed, the terminal device 10 has performed capturing in the same area as described above, this captured image is highly likely to have the target video image of the specific type. In addition, the system does not decide whether or not an actual captured image has the target video image of the specific type.

Figure 2:
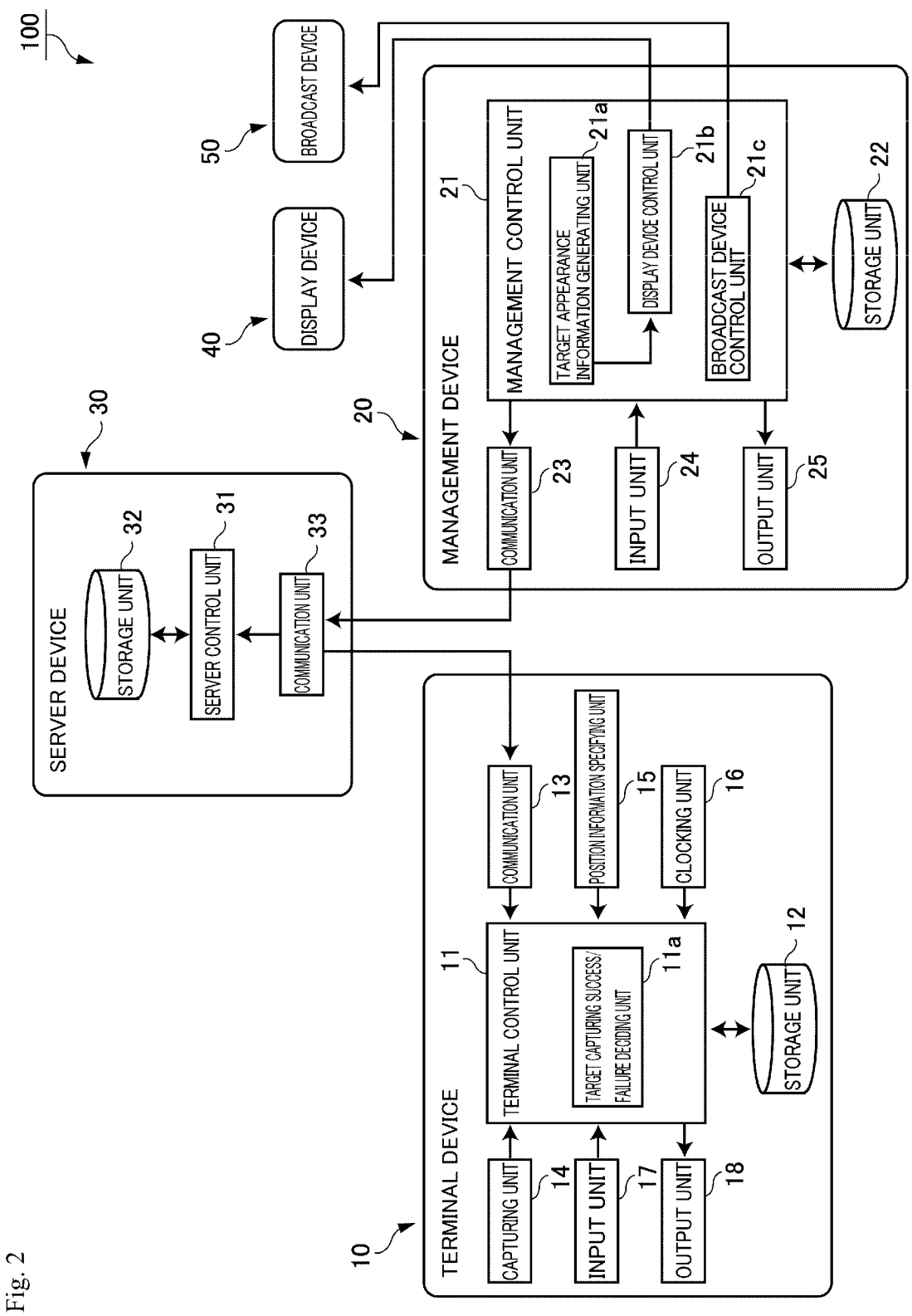
FIG. 2 is a block diagram illustrating a functional configuration of the collection system according to the present invention.

FIG. 2 illustrates a functional configuration of the collection system 100 according to one embodiment of the present invention. Each component which makes up the system will be described in detail below with reference to FIG. 2.

As illustrated in FIG. 2, the terminal device 10 includes a terminal control unit 11, a storage unit 12, a communication unit 13, a capturing unit 14, a position information specifying unit 15, a clocking unit 16, an input unit 17 and an output unit 18. In addition, FIG. 2 illustrates general functions as the functional configuration of the terminal device 10. The system assumes that there is a plurality of the terminal devices 10. However, all of each terminal device 10 do not need to employ the same configuration, and may employ different configurations.

The terminal control unit 11 performs arithmetic operation processing of controlling the other components 12 to 18 of the terminal device 10. A processor such as a CPU or a GPU can be used as the terminal control unit 11. The terminal control unit 11 reads an application program stored in the storage unit 12, and controls the other components according to this application program. Furthermore, the terminal control unit 11 can appropriately write or read an arithmetic operation result matching the application program in or from the terminal device 10.

Furthermore, according to the present embodiment, the terminal control unit 11 includes a target capturing success/failure deciding unit 11a. The target capturing success/failure deciding unit 11a is one functional unit which is realized by the terminal control unit 11. The target capturing success/failure deciding unit 11a has a function of judging whether or not: a capturing place of the terminal device 10 belongs to the same area as that of the certain display device 40; and a capturing time of the terminal device 10 matches with a display time of the target video image of the specific type of the display device 40, based on target appearance information generated by the management device 20, and deciding that the terminal device 10 has captured the target video image of the specific type on it's own if judging that aforementioned is matched. Detailed processing performed by the target capturing success/failure deciding unit 11a will be described below with reference to FIG. 4.

The storage unit 12 of the terminal device 10 is a component which stores information used for arithmetic operation processing of the terminal control unit 11. More specifically, the storage unit 12 stores an application program which causes a general mobile information communication terminal to function as the terminal device 10 in the collection system 100 according to the present invention. This application program may be downloaded to the terminal device 10 via the Internet or may be pre-installed in the terminal device 10. Furthermore, the storage unit 12 may store other programs in addition to the application programs for the system. When the application program for the system is activated according to a user's instruction, processing matching this program is executed. A storage function of the storage unit 12 is realized by a non-volatile memory such as an HDD and an SDD. Furthermore, the storage unit 12 may have a function as a memory in which an intermediate progress of the arithmetic operation processing of the terminal control unit 11 is written or read. A memory function of the storage unit 12 can be realized by a volatile memory such as an RAM or a DRAM. Furthermore, the storage unit 12 of the terminal device 10 stores a user ID unique to the user who owns the terminal device 10. Furthermore, the storage unit 12 stores an IP address which is identification information on a network.

The communication unit 13 of the terminal device 10 is a component which transmits and receives information between the terminal device 10 and the server device 30 via the Internet. The communication unit 13 can receive various pieces of information from the server device 30 and transmit the various pieces of information to the server device 30, under control of the terminal control unit 11. In the present embodiment, the terminal device 10 receives target appearance information (timetable) generated by the management device 20 from the server device 30 via the communication unit 13. Information (more specifically, the target appearance information) received from the server device 30 by the communication unit 13 is stored in the storage unit 12.

The capturing unit 14 is a camera which obtains image data of a still image or a moving image. A camera built in the terminal device 10 is used as the camera which makes up the capturing unit 14. Image data obtained by the capturing unit 14 is sent to the terminal control unit 11, is subjected to predetermined arithmetic operation processing, and then is stored in the storage unit 12. The camera is realized by a photoelectric conversion element such as a lens, a mechanical shutter, a shutter driver, a CCD image sensor unit or a CMOS image sensor unit, a digital signal processor (DSP) which reads a charge amount from the photoelectric conversion element and generates image data, and an IC memory.

The position information specifying unit 15 is a component which specifies current position information of the terminal device 10. In the present embodiment, the position information specifying unit 15 of the terminal device 10 has a function which can receive position information sent from the broadcast device 50. For example, when the broadcast device 50 is an ultrasonic wave generating device, an ultrasonic sensor may be adopted as the position information specifying unit 15. When the broadcast device 50 is a light emitting device, an optical sensor may be adopted as the position information specifying unit 15. When the broadcast device 50 is a wireless base station, a beacon reception device may be adopted as the position information specifying unit 15. For example, a case where the broadcast device 50 is the ultrasonic wave generating device will be described as an example. The broadcast device 50a in the area A emits an ultrasonic wave of 100 kHz. The broadcast device 50b in the area B emits an ultrasonic wave of 150 kHz. The broadcast device 50c in the area C emits an ultrasonic wave of 200 kHz. Consequently, when detecting, for example, the ultrasonic wave of approximately 100 kHz, the position information specifying unit 15 of the terminal device 10 can specify that the current area is the area A. In addition, information for associating the frequency of the ultrasonic wave and each area is stored in the storage unit 12 of the terminal device 10. Consequently, by detecting the frequency of the ultrasonic wave, and cross-checking this frequency with the information stored in the storage unit 12, the position information specifying unit 15 can specify which area this frequency belongs to. Consequently, by employing as the position information specifying unit 15 of the terminal device 10 a functional configuration which can directly obtain position information from the broadcast device 50 belonging to the same area, the terminal device 10 can specify the current position of the terminal device 10 even if the terminal device 10 is in the offline state. In addition, the position information specifying unit 15 of the terminal device 10 may be a GPS positioning unit which has a function of performing positioning by using a Global Positioning System (GPS). More specifically, the GPS positioning unit measures a time taken to receive each radio wave based on information of a radio wave transmission time included in the radio waves sent from a plurality of GPS satellites, and calculates information related to a latitude and a longitude of a located position of the terminal device 10 based on time information indicating this time.

The clocking unit 16 performs various clocking processing by using a system clock such as a Real Time Clock (RTC). For example, the clocking unit 16 clocks a current time or clocks a capturing time at which the capturing unit 14 has captured an image. Information related to the time obtained by the clocking unit 16 is sent to the terminal control unit 11, and is used for arithmetic operation processing by the terminal control unit 11.

The input unit 17 of the terminal device 10 is a component which accepts an input of information from the user to the terminal device 10. The information inputted via the input unit 17 transmits to the terminal control unit 11. The input unit 17 can adopt various input devices used by a known information communication terminal. The input unit 17 is, for example, a touch panel, a button, a cursor, a microphone, a keyboard and a mouse, yet is not limited to this. Furthermore, the touch panel which makes up the input unit 17 may make up a touch panel display together with a display which makes up the output unit 18.

The output unit 18 of the terminal device 10 is a component which outputs various pieces of information to the user of the terminal device 10. The information subjected to the arithmetic operation processing by the terminal control unit 11 is outputted by the output unit 18. The output unit 18 can adopt various external output devices used by the known information communication terminal. The output unit 18 is, for example, a display, a speaker, a flash light and a vibrator, yet is not limited to these. As described above, the display may be a touch panel display. The output unit 18 can output various pieces of information under control of the terminal control unit 11.

As illustrated in FIG. 2, the management device 20 includes a management control unit 21, a storage unit 22, a communication unit 23, an input unit 24 and an output unit 25. The management device 20 is basically a computer which controls each display device 40 disposed in each area, and is preferably disposed in the same facility as that of each display device 40 and connected to each display device 40 by way of wired or wireless connection. In this regard, the management device 40 may be connected to each display device 40 via the Internet or may be disposed in a facility different from that having each display device 40.

The management control unit 21 entirely controls other components 22 to 35 of the management device 20. A processor such as a CPU or a GPU can be used as the management control unit 21. The management control unit 21 is also able to generate information for the terminal device 10 and transmit this information via the communication unit 23. Hence, the management control unit 21 of the management terminal 20 plays a function of controlling the terminal device 10 in the system, too.

Figure 3:
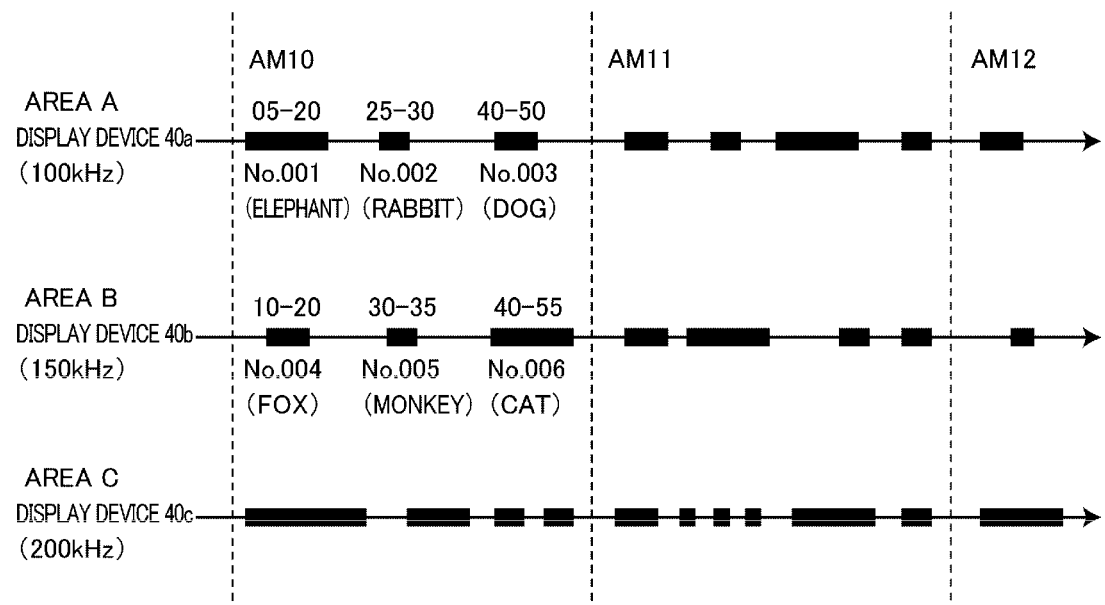
FIG. 3 is a conceptual diagram illustrating an example of a target appearance information (timetable).

The management control unit 21 includes a target appearance information generating unit 21a which generates target appearance information. The "target appearance information" is information for specifying at least a display device (place) which displays a target video image, a type of the target which is displayed by the display device, and a display time of the target video image of the type. More specifically speaking, the target appearance information is defined by associating information related to a certain area and information related to a display device belonging to this area, and is further defined in association with the information related to the certain area and position information (the frequency of the ultrasonic wave) outputted from the broadcast device 50 to specify and this area. For example, FIG. 3 schematically illustrates one example of the target appearance information. In the example in FIG. 3, the target appearance information is defined such that the projector 40a belonging to the area A displays a video image of the elephant (ID No. 001) from AM 10:05 to 10:20, displays the video image of the rabbit (ID No. 002) from AM 10:25 to 10:30, and displays the video image of the dog (ID No. 003) from AM 10:40 to 10:50 between AM 10:00 and AM 11:00. Furthermore, for example, that the display device 40a is disposed in the area A, and that the broadcast device 50 outputs the ultrasonic wave of the frequency of 100 kHz in the area A are defined as the target appearance information.

Thus, the target appearance information is information which defines which type of a target video image each display device displays in which time zone, and is similar to data of a timetable format. Furthermore, the target appearance information defines which area each display device belongs to and what position information is broadcast from the broadcast device 50 in each area. In addition, the target appearance information described herein defines that a target video image of a specific type is displayed by a specific display device in a "specific time zone" from past to future. In this regard, the example of the target appearance information is not limited to this, and may be, for example, information which defines that a target video image of a specific type is displayed by the specific display device "now". The former and the latter define a target type, a display place and a display time, and therefore is common information.

The target appearance information generating unit 21a can accept information inputted by the administrator via the input unit 24, and generate or correct the target appearance information. That is, the administrator can freely generate and correct the target appearance information (timetable) illustrated in FIG. 3 by operating the management device 20. Thus, the target appearance information generating unit 21a is provided to the management device 20, and the administrator can optionally generate this information, so that it is possible to freely adjust a type and a timing of a video image to be displayed by the display device 40 according to a situation in a facility such as the exhibition hall or the store. In addition, the target appearance information can be stored in advance in the storage unit 22, and, in this case, the target appearance information generating unit 21a may read information in this storage unit 22.

Furthermore, the management control unit 21 includes a display device control unit 21b which controls the display device 40. The display device control unit 21b controls the display device 40 installed in each area according to the target appearance information generated by the target appearance information generating unit 21a. As described above, the target appearance information defines a type and a display time of a target whose video image is displayed per display device 40. Consequently, according to this target appearance information, the display device control unit 21b can control the type and the display time of the target whose video image is displayed per display device 40. Thus, the display device 40 disposed in each area operates according to the target appearance information.

Furthermore, the management control unit 21 includes a broadcast device control unit 21c which controls the broadcast device 50 installed in each area. The broadcast device control unit 21c controls each broadcast device 50 to broadcast different position information from each broadcast device 50 per area. For example, a case where the broadcast device 50 is the ultrasonic wave generating device will be described as an example. The broadcast device control unit 21c controls each broadcast device to generate ultrasonic waves of different frequencies such as 100 kHz, 150 kHz and 200 kHz from the broadcast devices 50a to 50c installed in the area A, the area B and the area C. Consequently, by detecting the position information (e.g., the frequency of the ultrasonic wave) outputted from the broadcast device 50, the position information specifying unit 15 of the terminal device 10 can specify which area an area of a current position is.

The storage unit 22 of the management device 20 is a component which stores information used for arithmetic operation processing of the management control unit 21. A storage function of the storage unit 22 is realized by a non-volatile memory such as an HDD and an SDD. Furthermore, the storage unit 22 may have a function as a memory in which an intermediate progress of the arithmetic operation processing of the control arithmetic operation unit 21 is written or read. A memory function of the storage unit 22 can be realized by a volatile memory such as an RAM or a DRAM.

Furthermore, the storage unit 22 of the management device 20 stores target video image data displayed by the display device 40. The target video image data may be still image data or moving image data. The target to be displayed as a video image is not limited in particular, yet is, for example, an animal, a plant, an insect, an aquatic life, a car, a ship, an airplane, or a character of an animation, a movie, a cartoon or a story. Furthermore, the storage unit 22 stores a plurality of types of target video image data. For example, while a video image of an animal is displayed by the display device 40 in one example of the system described in this description, various animals such as the elephant (ID No. 001), the rabbit (ID No. 002), the dog (ID No. 003), the fox (ID No. 004), the monkey (ID No. 005) and the cat (ID No. 006) are stored together with these IDs in a database constructed by the storage unit 22. The display device control unit 21b of the management control unit 21 reads target video image data from the storage unit 22 according to the target appearance information, and displays target video image data on the predetermined display device 40 during a predetermined display time.

The communication unit 23 of the management device 20 is a component which transmits and receives information between the management device 20 and the server device 30 via the Internet. The communication unit 23 can receive various pieces of information from the server device 30 and transmit the various pieces of information to the server device 30, under control of the management control unit 21. In the present embodiment, the management device 20 transmits the target appearance information generated by the management control unit 21 from the communication unit 23 to the terminal device 10 via the server device 30. Consequently, the management device 20 and the terminal device 10 can share information (target appearance information) indicating which display device displays what type of a target video image at what timing.

The input unit 24 of the management device 20 is a component which accepts an input of information for the management device 20 from the administrator. The information inputted via the input unit 24 transmits to the management control unit 21. The input unit 24 can adopt various input devices used by a known information communication terminal. The input unit 17 is, for example, a touch panel, a button, a cursor, a microphone, a keyboard and a mouse, yet is not limited to this. The administrator can generate optional target appearance information by inputting information via the input unit 24.

The output unit 25 of the management device 20 is a component which outputs various pieces of information to the administrator. The information subjected to the arithmetic operation processing by the management control unit 21 is outputted by the output unit 25. The output unit 25 can adopt various external output devices used by a known personal computer. The output unit 25 is, for example, a display or a speaker, yet is not limited to this. In addition, the display may be a touch panel display.

As illustrated in FIG. 2, the server device 40 includes a server control unit 31, a storage unit 32 and a communication unit 33. In the present embodiment, the server device 40 mainly has a relay function of providing the target appearance information received from the management device 20 to the terminal device 10.

The server control unit 31 entirely controls the server device 30. A processor such as a CPU or a GPU can be used as the server control unit 31.

The storage unit 32 of the server device 30 is a component which stores information used for arithmetic operation processing of the server control unit 31. A storage function of the storage unit 32 is realized by a non-volatile memory such as an HDD and an SDD. Furthermore, a memory function of the storage unit 32 can be realized by a volatile memory such as an RAM or a DRAM.

The communication unit 33 of the server device 30 is a component which transmits and receives information between the server device 30 and the terminal device 10 and between the server device 30 and the management device 20 via the Internet. As described above, the server device 30 receives the target appearance information from the management device 20 via the communication unit 33, and transmits the target appearance information to the terminal device 10. The target appearance information received from the management device 20 is stored in the storage unit 32 of the server device 30. Furthermore, when the management device 20 corrects the target appearance information, the target appearance information stored in the storage unit 32 of the server device 30 is also updated.

The display device 40 displays the target video image under control of the management device 20. The display device 40 can adopt a projector which projects a video image on a screen or a wall or can adopt a liquid crystal display or an organic EL display which can display the video image. Furthermore, the display device 40 may display a three-dimensional hologram video image. In addition, a known display device can be appropriately employed as the display device 40. At least the one display device 40 is displayed in each area. A plurality of display devices 40 can be disposed in one area. However, a plurality of display devices 40 disposed in the same area is basically controlled to display a target video image of the same type.

The broadcast device 50 is a component which broadcasts position information to the terminal device 10. The broadcast device is, for example, an ultrasonic wave generating device which generates an ultrasonic wave of a predetermined frequency and transmits position information of the area, a light emitting device which puts information on visible light or invisible light and transmits the position information of the area, and a wireless base station which transmits the position information of the area by near field wireless communication (so-called BLE) using a beacon. At least the one broadcast device 50 is displayed in each area. Information sent from the broadcast device 50 in each area differs in each area. When, for example, the broadcast device 50 is the ultrasonic wave generating device, the frequency of the ultrasonic wave emitted in each area differs. Hence, by analyzing information sent from the broadcast device 50, the terminal device 10 can specify which area the current position of the terminal device 10 belongs to. A plurality of broadcast devices 50 can be disposed in one area. However, a plurality of broadcast devices 50 disposed in the same area basically transmits the same position information to the terminal device 10.

Figure 4:
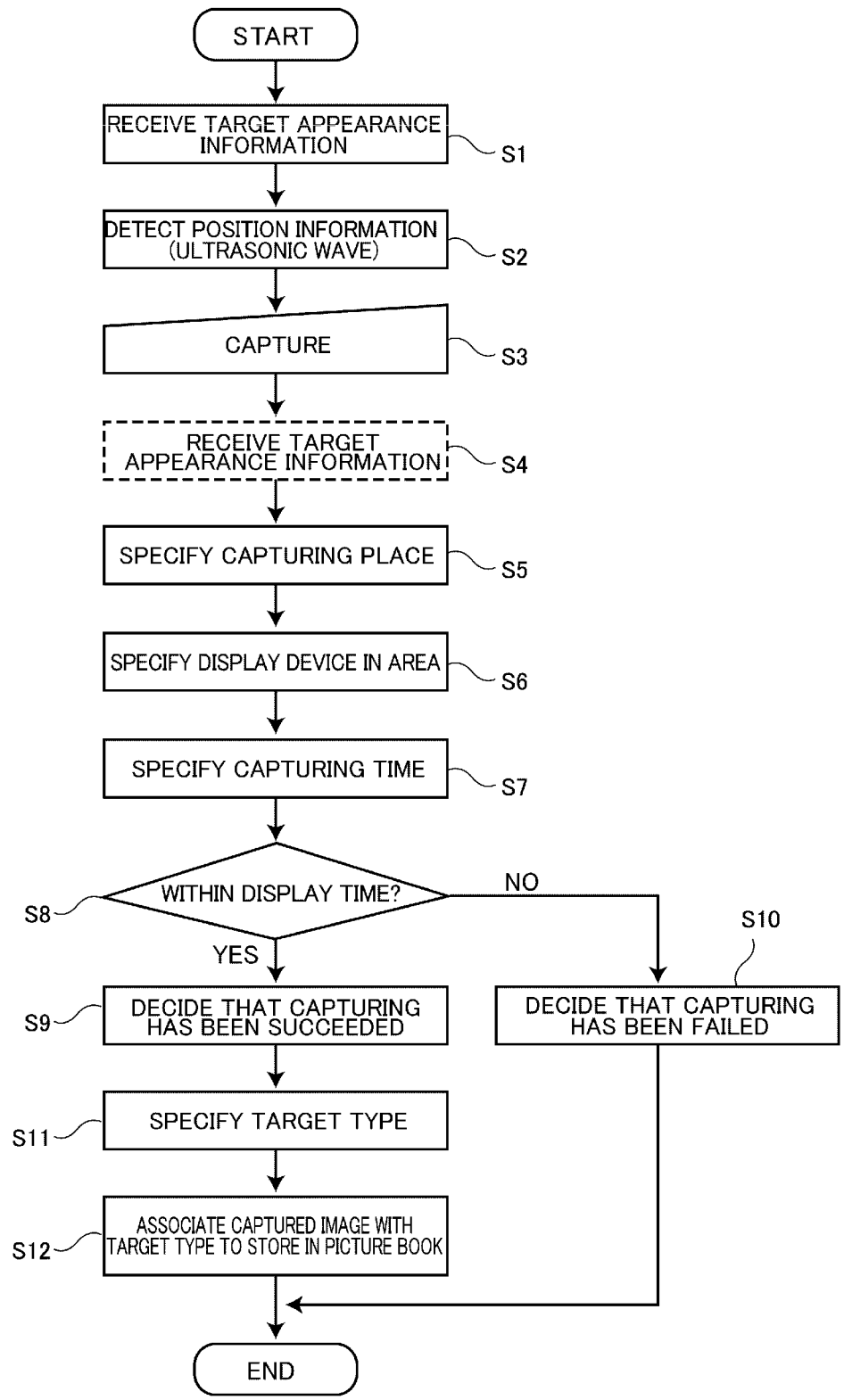
FIG. 4 is a flowchart illustrating one example of processing performed by a terminal device.

Next, one example of processing performed by the terminal device 10 will be described with reference to FIG. 4. In this regard, processing of specifying a type of a target video image which is highly likely to be captured in a captured image when the terminal device 10 has performed capturing in one area will be mainly described.

First, as preparation, before the user who has the terminal device 10 enters the facility such as the exhibition or the store, the terminal device 10 receives (downloads) from the server device 30 the target appearance information generated by the management device 20 (step S1). The terminal device 10 stores in the storage unit 12 the target appearance information received from the server device 30. As described above, the target appearance information includes information related to the display device (place) which displays a target video image, information related to the type of the target displayed by the display device, and information related to the display time in which the target video image is displayed by the display device. Furthermore, the target appearance information is defined by associating information related to a certain area and information related to a display device belonging to this area, and is further defined in association with the information related to the certain area and position information (the frequency of the ultrasonic wave) outputted from the broadcast device 50 to specify and this area. Consequently, by obtaining the target appearance information, the terminal device 10 can learn the display device 40 disposed in each area, position information broadcast from the broadcast device 50 in each area, the type of the target video image displayed by each display device 40, and a time in which each display device displays the target video image. Instead, when there is a place in a facility which the radio wave does not reach, or if the terminal device 10 is in the offline state, the terminal device 10 can specify the type of the target included in a captured image.

Next, when entering the area in which the display device 40 and the broadcast device 50 are disposed, the terminal device 10 detects position information broadcast from the broadcast device 50 (step S2). For example, the frequency of the ultrasonic wave emitted from the broadcast device 50 per area differs. Consequently, the position information specifying unit 15 analyzes the frequency of the ultrasonic wave, so that the terminal device 10 can specify the area in which the terminal device 10 is located. In addition, when the areas are close to each other, the position information specifying unit 15 of the terminal device 10 is likely to simultaneously detect two types or more of the frequencies. In this case, the position information specifying unit 15 may compare the strength of the two types of the frequencies, and specify the area associated with the frequency of the higher strength as the area in which the terminal device 10 is located.

Next, when finding a target video image displayed by the display device 40 in the area, the user of the terminal device 10 captures this target video image by a camera (capturing unit 14) (step S3). Subsequently, the flow transitions to processing of specifying a target type which is likely to be captured in this captured image.

When capturing is performed, the terminal device 10 accesses the server device 30, and receives the target appearance information again (step S4). In this regard, this step S4 is not indispensable, and can be omitted when the terminal device 10 is in the offline state. Furthermore, this step S4 is performed to receive the latest target appearance information, and consequently can be omitted when the target appearance information received in step S1 is not changed. On the other hand, when step S4 is indispensable, step S1 can be also omitted.

Next, the terminal device 10 specifies a capturing place at which a target video image has been captured (step S5). In above-described step S2, the terminal device 10 detects the position information broadcast from the broadcast device 50. Therefore, when having performed capturing in the same area as is, the terminal device 10 specifies this area as a capturing place (capturing area) based on the position information obtained from this broadcast device 50.

Next, the terminal device 10 specifies the display device 40 disposed in the same area as that of the capturing place (step S6). The target appearance information defines which display device 40 is disposed in which area. Consequently, by referring to this target appearance information, the terminal device 10 can specify the display device 40 in the same area as the capturing place of the terminal device 10.

Next, the terminal device 10 specifies a time at which the terminal device 10 has performed capturing (step S7). The clocking unit 16 measures the time, and therefore the terminal device 10 obtains the capturing time from this clocking unit 16.

Next, the target capturing success/failure deciding unit 11*a* of the terminal control unit 11 of the terminal device 10 refers to the target appearance information, and judges whether or not the capturing time obtained in step S7 is within the display time of the target video image of the display device 40 belonging to the same area as that of the terminal device 10 during capturing (step S8). Furthermore, if judging that the capturing time obtained in step S7 is within the display time of the target video image of the display device 40 belonging to the same area as that of the terminal device 10 during capturing, the target capturing success/failure deciding unit 11*a* decides that the terminal device 10 has succeeded in capturing a target of a specific type displayed by this display device 40 (step S9). For example, in the example illustrated in FIG. 3, the target appearance information defines that the display device 40*a* in the area A displays the video image of the elephant (ID No. 001) from AM 10:05 to 10:20. Hence, the display device 40*a* in the area A displays the video image of the elephant from AM 10:05 to 10:20 according to this target appearance information. Hence, when the capturing place of the terminal device 10 is in the area A and the capturing time of the terminal device 10 is from AM 10:05 to 10:20, the capturing place and the capturing time of the terminal device 10 match with a display place and a display time of the video image of the elephant. Therefore, the captured image of the terminal device 10 is highly likely to have the video image of the elephant displayed by the display device 40*a* of the area A. Hence, when the capturing place and the capturing time of the captured image match with the display place and the display time of the video image of the elephant, the target capturing success/failure deciding unit 11*a* of the terminal device 10 decides that the video image of the elephant has been successfully captured. On the other hand, when judging NO in step S8, the target capturing success/failure deciding unit 11a decides that capturing the target displayed by the display device 40 has failed (step S10).

Next, the target capturing success/failure deciding unit 11a specifies the type of the target which has been successfully captured (step S11). When the capturing time of the terminal device 10 is within the display time of the display device 40, it is possible to uniquely specify the type of the target displayed by this display device 40 by referring to the target appearance information. Thus, the type of the target captured in the captured image is specified. In the above example, it is decided that the captured image of the terminal device 10 has the video image of the elephant.

Figure 5:
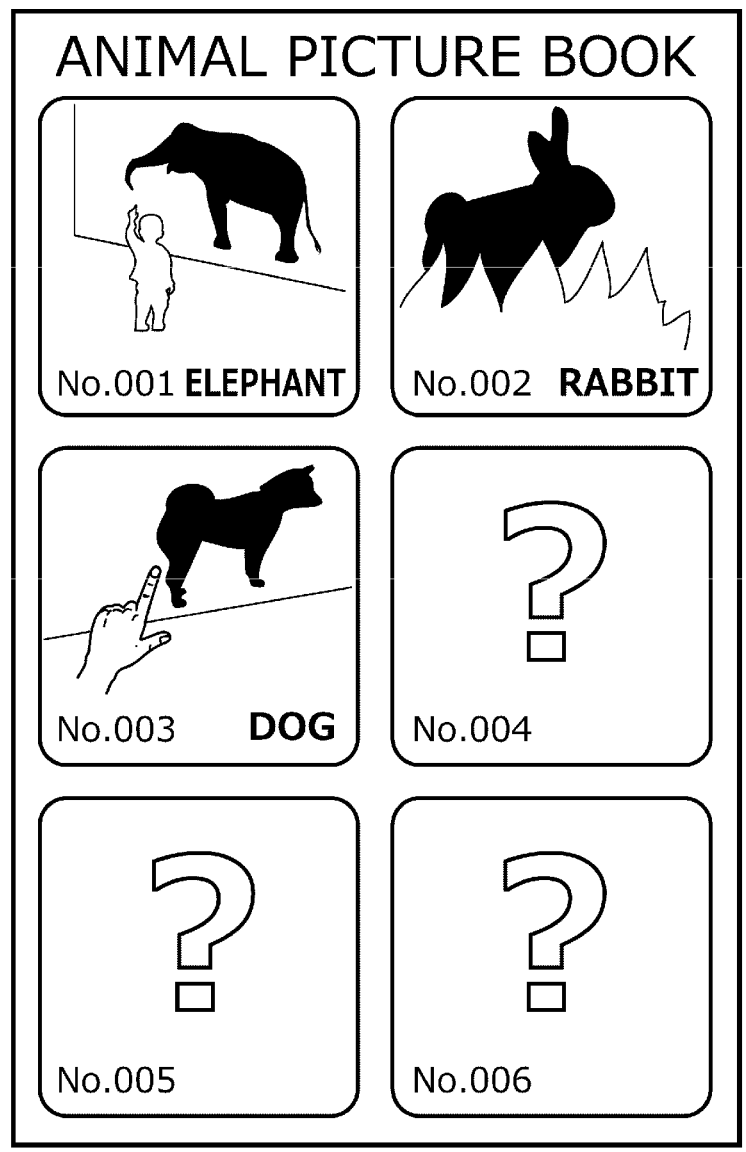
FIG. 5 illustrates one example of a digital animal picture book.

Next, the terminal control unit 11 of the terminal device 10 associates the captured image captured in step S3 with the target type specified in step S11 to store in the storage unit 12 (step S12). More specifically, the storage unit 12 includes a storage space for storing captured images, and the captured images are preferably stored in the picture book format in the storage unit 12. For example, FIG. 5 illustrates one example of a picture book which stores captured images. As illustrated in FIG. 5, the storage space for the picture book can classify target (animal) captured images into target types to record. For example, captured images for the elephant can be recorded in the storage area for ID No. 001, and captured images for the rabbit can be recorded in the storage area for ID No. 002. Hence, when it is decided in steps S10 to S12 that the video image of the elephant has been successfully captured, this captured image is stored in the storage area for ID No. 001 (the storage are for the elephant). In this way, it is possible to store captured images in the picture book format, so that it is possible to provide to the user of the terminal device 10 an entertainment that the user walks in the exhibition hall or the store, captures target video images of various types in each area and collects these captured images.

As described above, the system according to the present invention can specify the type of the target included in the captured image and store the captured image in a picture book format without analyzing the captured image of the terminal device 10. Furthermore, when specifying a type of a target included in a captured image, the terminal device 10 does not need to communicate with the server device 30, and consequently can quickly specify this type.

The description of this application has described the embodiment of the present invention above with reference to the drawings to express contents of the present invention. In this regard, the present invention is not limited to the above embodiment, and includes modified embodiments and improved embodiments which are obvious for one of ordinary skill in the art based on the matters disclosed in this description of this application.

For example, according to the preferred embodiment described in the description of this application, the terminal device 10 includes the target capturing success/failure deciding unit 11a, and the management device 20 includes the target appearance information generating unit 21a. In this case, the functions of these target capturing success/failure deciding unit 11a and target appearance information generating unit 21a may be performed by the server control unit 31 of the server device 30. In this case, in place of the management device 20, the server control unit 31 of the server device 30 generates target appearance information. Furthermore, when the terminal device 10 has performed capturing, the server device 30 decides whether or not this captured image has a target of a specific type. For example, the server device 30 transmits the target appearance information generated by the server device 30 to the management device 20, and causes the management device 20 to control the display device 40 in each area based on this target appearance information. Furthermore, after the terminal device 10 performs capturing, the terminal device 10 transmits position information obtained from the broadcast device 50 by the terminal device 10 and information related to a capturing time to the server device 30. When receiving these pieces of information from the terminal device 10, the server device 30 refers to the target appearance information generated by the server device 30, and judges whether or not: a capturing place of the terminal device 10 belongs to the same area as that of the display device 40; and the capturing time of the terminal device 10 matches with the display time of the target video image of the specific type of the display device 40. Furthermore, if judging that aforementioned is matched, the server device 30 decides that the terminal device 10 has succeeded in capturing the target video image of the specific type, and provides information related to a decision result to the terminal device 10. Consequently, the server device 30 can specify the type of the target which is highly likely to be captured in a captured image without analyzing the captured image. Furthermore, by so doing, the terminal device 10 can specify the type of the target which is highly likely to be captured in the captured image of the terminal device 10 based on the decision result of the server device 30. Consequently, the terminal device 10 can associate the captured image with the target type to store in the picture book format.

INDUSTRIAL APPLICABILITY

The present invention relates to a system which can collect images of characters in a digital picture book. Hence, the present invention can be suitably used in an entertainment industry.

REFERENCE SIGNS LIST

10 TERMINAL DEVICE
11 TERMINAL CONTROL UNIT
11a TARGET CAPTURING SUCCESS/FAILURE DECIDING UNIT
12 STORAGE UNIT
13 COMMUNICATION UNIT
14 CAPTURING UNIT
15 POSITION INFORMATION SPECIFYING UNIT
16 CLOCKING UNIT
17 INPUT UNIT
18 OUTPUT UNIT
20 MANAGEMENT DEVICE
21 MANAGEMENT CONTROL UNIT
21a TARGET APPEARANCE INFORMATION GENERATING UNIT
21b DISPLAY DEVICE CONTROL UNIT
21c BROADCAST DEVICE CONTROL UNIT
22 STORAGE UNIT
23 COMMUNICATION UNIT
24 INPUT UNIT
25 OUTPUT UNIT
30 SERVER DEVICE
31 SERVER CONTROL UNIT
32 STORAGE UNIT
33 COMMUNICATION UNIT
100 COLLECTION SYSTEM

The invention claimed is:

1. A system comprising: a terminal device; a plurality of display devices which displays a target video image; and a management device which controls the display devices, wherein
the management device
causes a specific display device to display the target video image of a specific type during a specific display time based on data of a timetable format for specifying a display device which displays a target video image, a type of a target displayed by the display device, and a display time of the target video image of the type,
the system further comprises a plurality of ultrasonic wave generating device which generates an ultrasonic wave of a predetermined frequency for each area and broadcasts position information of the area, and
the terminal device includes
a camera which obtains image data of a still image or a moving image,
a clock which specifies a capturing time at which the capturing unit has performed the capturing,
an ultrasonic sensor for specifying a current area of the terminal device when detecting the ultrasonic wave,
a memory or a storage storing the data of a timetable format, and
a processor
judging whether or not: a capturing place of the terminal device belongs to a same area as that of a certain display device; and a capturing time of the terminal device matches with a display time of the target video image of the specific type of the display device, based on the data of a timetable format, and
deciding that the camera has captured the target video image of the specific type if judging that aforementioned are matched.

2. The system according to claim 1, wherein
the management device includes
a processor a which generates the data of a timetable format, and
a communication device which transmits the data of a timetable format to the terminal device.

3. The system according to claim 2, further comprising
a server device which is connected to the terminal device and the management device via an Internet, wherein
the server device includes a device which receives the data of a timetable format generated by the processor of the management device, and transmits the target appearance information to the terminal device.

4. A program causing a mobile information communication terminal to function as the terminal device in the system according to claim 1.

* * * * *